Oct. 13, 1970 L. STARK ET AL 3,533,684
DISPLAY OF MEASUREMENT ADEQUACY MARKER SYSTEM FOR PUPILLOMETERS
Filed June 26, 1967
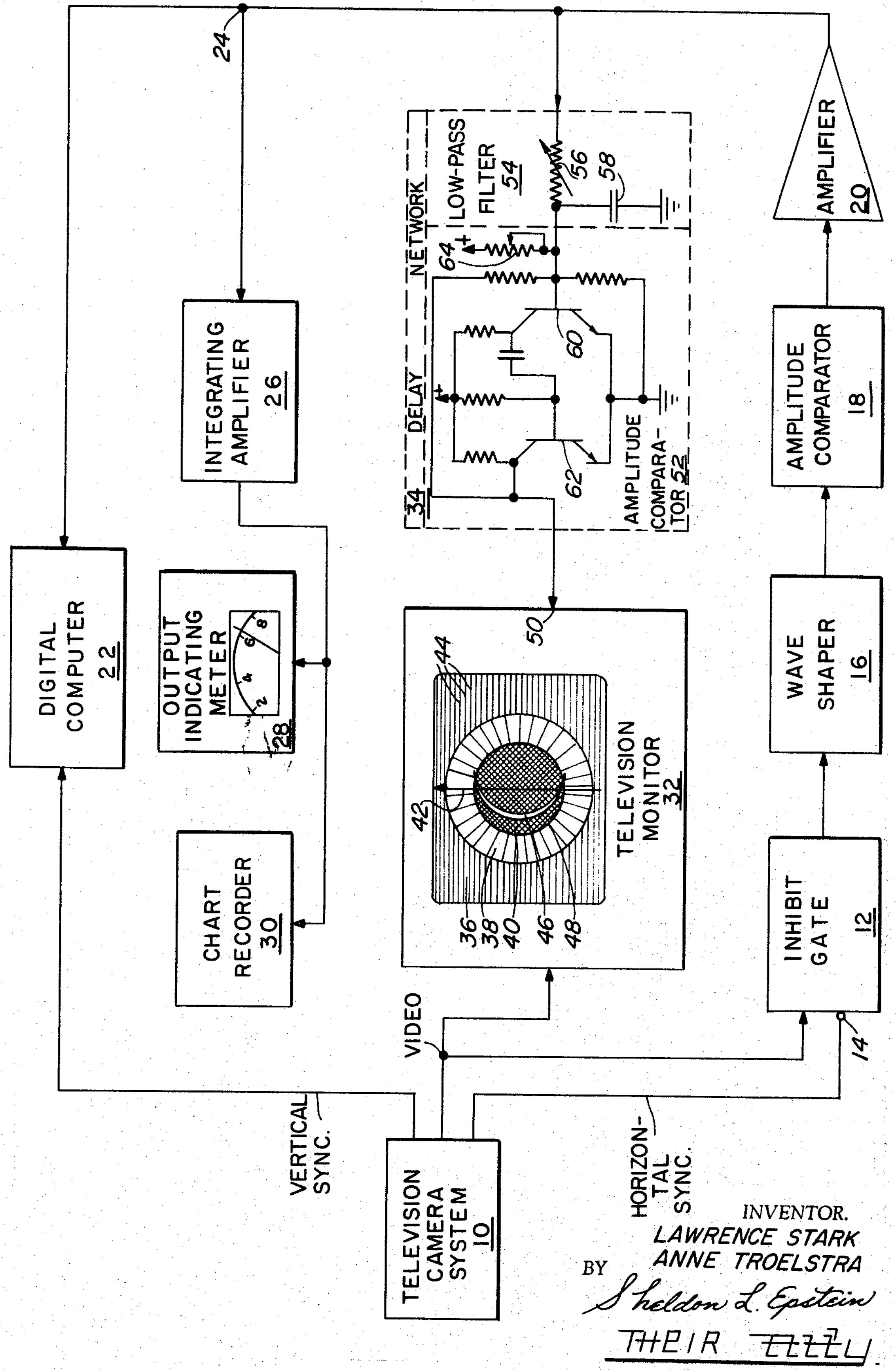
INVENTOR.
LAWRENCE STARK
ANNE TROELSTRA
BY Sheldon L. Epstein
THEIR [illegible]

United States Patent Office
3,533,684
Patented Oct. 13, 1970

3,533,684
DISPLAY OF MEASUREMENT ADEQUACY MARKER SYSTEM FOR PUPILLOMETERS

Lawrence Stark, 910 Lake Shore Drive 60611, and Anne Troelstra, 7410 S. Crandon 60649, both of Chicago, Ill.

Continuation-in-part of application Ser. No. 645,800, June 13, 1967. This application June 26, 1967, Ser. No. 648,782
Int. Cl. A61b *3/00, 3/10*
U.S. Cl. 351—1 7 Claims

ABSTRACT OF THE DISCLOSURE

An electronic pupillometer comprises a closed circuit television system for transducing an image of the eye into video scanning signal and a circuit for analyzing the scanning signals to determine the instantaneous size of the pupil by counting the number of television scanning lines which traverse the image of the pupil. Each time a scanning line traverses the pupil, a count pulse is generated and fed to a computer system for calculating pupil size and to an integrating amplifier that provides a voltage representative of the number of count pulses. Each count pulse is also transmitted to a television monitor after delay and shaping to produce a white crescent marker having the same profile as the leading edge of the pupil-iris boundary being scanned to indicate that the pupillometer is operating properly.

BACKGROUND OF INVENTION

Related application

This application is a continuation-in-part of our copending application, Ser. No. 645,800, filed June 13, 1967, entitled Dynamic Pupillometers and is assigned to the assignee of that application.

Field of invention

This invention is in the field of electronic accessories for medical diagnostic instruments and, more particularly, is a system for displaying a visible indication of the measurement adequacy of a dynamic pupillometer during use.

Description of the prior art

During the last 10 years, intensive effort has been devoted to the development of dynamic pupillometers for instantaneously measuring and recording the size of a pupil of an eye. A history of these developments and citations to the most important papers and references appears in our copending application entitled Dynamic Pupillometers.

As described in our copending application, the dynamic pupillometer must be able to measure minute changes in pupil size to within a fraction of a millimeter independent of the eye's position, velocity or acceleration. Because the eye can rotate through arcs as great as 100° and attain rotational velocities of 600° per second during saccadic movements as well as exhibit an oscillation mode similar to that of a sampled-data control system having an amplitude of a few millimeters even when a fixation point is provided, there has been some concern as to whether the various pupillometers which have been developed are sensitive only to the change in pupil size.

The most popular dynamic pupillometers are of the scanning type in which the eye or an image of the eye is scanned periodically in a predetermined pattern by a series or raster of lines. During scanning, light reflected from the eye is transduced into electrical (video) scanning signals having amplitudes which are a function of the amount of light reflected from the sclera (which is almost totally reflective), the iris (which is partially reflective) and the pupil (which is not reflective). By analyzing these scanning signals, it is possible to determine when a scanning line has traversed the pupil and a measurement of the pupil size can be made by counting the number of scanning lines which have traversed the pupil or by timing the period required for traversing the longest chord.

Either of two types of scanning systems may be used. The first is the electromechanical scanning system in which the eye is scanned by a series of lines of light and reflected light is transduced into scanning signals by a device such as a light sensitive diode pointed in the general direction of the eye. An excellent example of electromechanical scanning pupillometers is described in Lowenstein and Loewenfeld. Electronic Pupillography, A.M.A. Archives of Opthalmology, vol. 59, March 1958, p. 352–63. The second system is an electronic scanning system in which the eye is illuminated by a radiation source and the reflected light is imaged on a television camera tube where the image of the eye is sequentially scanned. Such a system is fully described in our copending application as well as in Asano, Stark, et al., Pupillometery, Quarterly Progress Report No. 66, Research Laboratory of Electronics, Massachusetts Institute of Technology, July 15, 1962, pp. 404–12.

In both the electromechanical and electronic scanning pupillometers, means for reproducing a picture of the eye from the scanning signals are provided to aid in the optical alignment of the instrument. The most common picture reproducing means comprises a cathode ray tube with X-axis and Y-axis deflection signals synchronized with the scanning pattern and the Z-axis (beam intensity) controlled by the scanning signals in the same manner in which television signals are reproduced.

By viewing the reproduced pictures of the eye, the operator can determine whether the instrument is in proper alignment and proper focus; however, no additional information on measurement adequacy, such as identification of the area actually being measured, is displayed.

Accordingly, a principal object of this invention is the provision of a display of measurement adequacy marker system for scanning-type pupillometers which positively identifies the area of the eye which is being measured.

This and other objects, features and advantages of this invention will be more readily understood from the following detailed description of a preferred embodiment in which the figure is a combination schematic and block diagram of an electronic, closed circuit television, line scanning, dynamic pupillometer containing a display of measurement adequacy marker system.

DESCRIPTION OF A PREFERRED EMBODIMENT

A preferred embodiment of a display of measurement adequacy marker system of this invention is illustrated in the figure as part of an electronic scanning pupillometer. As a complete description of this pupillometer appears in our copending application, Ser. No. 645,800, filed June 13, 1967, entitled Dynamic Pupillometers; only a short description of it will be presented here.

Reflected light from a subject's eye is transmitted to television camera system 10 where it is transduced into video scanning signals. The video signal and the television camera system's horizontal synchronizing (sync) signals are transmitted to two input terminals of inhibit gate 12 with the horizontal sync signal being transmitted to the inhibitor terminal 14. The inhibit gate 12 transmits only the image portions of the video signal applied to its input and not the sync pulse portions which are inhibited because, as periodic signals, they contain no information.

The image portions of the video signal are transmitted to a wave shaper 16 which removes high frequency noise caused by thin, sharp, black lines in the image, such as those generated by eyelashes, and other causes. The wave shaper 16 also shapes the leading edges of the pulses of the video signal to improve the switching response of later portions of the circuit.

The shaped image portions of the video scanning signal are transmitted to an amplitude comparator 18 having its signal amplitude comparison point set near the video "black level." When the amplitude of the pupil part of the image of the video signal reaches the comparator's signal amplitude comparison point, the comparator generates a count signal. The comparison point is set so that it is attainable during the image portion of the video signal only by that part of the video signal related to the pupil. For this reason, the accuracy of the pupillometer is very high because it is solely the presence or absence of the pupil image, independent of the iris background, that determines whether a count pulse will be generated.

The amplitude comparator's count pulses, one count pulse being generated each time the image of the pupil is scanned by one of the lines of the scanning raster, are transmitted to amplifier 20 to increase their power before being fed to the remaining portions of the system.

While it is possible to obtain useful information simply by connecting a pulse counter to the output of the amplifier 20 to obtain a number which is functionally related to pupil size, most researchers and clinicians prefer to receive computer processed output data in terms such as pupil size or in formats which are indicative of the pupillary system's response characteristics such as a Bode plot, a Nyquist diagram, a transfer function, or a one or two-number indicator which is a function of the variance of the pupillary system's performance from some accepted standard.

To accomplish this result, the output of the amplifier 20 is connected to the input of a digital computer 22 which is programmed to analyze the information it receives in the form of count pulses from the amplifier 20 and to provide output data in the desired form. Vertical sync pulses are also transmitted to the computer 22 from the television camera system 10 for the purpose of identifying the beginning and the end of each scanning field.

For many purposes, the computational capabilities of a large computer are not required as all that is needed is data on the instantaneous pupil size or a record of pupil size as a function of time. In these cases, terminal 24 of the amplifier 20 may be connected to the input of an integrating amplifier 26. By adjusting the time constant of integration to be within a few multiples of the field scanning time, the integrating amplifier output signal will be an analog signal whose magnitude is a function of the number of count pulses per field and therefore the size of the pupil. Because of the relatively large number of count pulses generated during a scanning field, averaging circuits may be used in place of peak voltage detecting means of prior art pupillometers to obtain a reasonably ripple-free as well as accurate analog output signal. This analog signal may then be used to drive an output indicating meter 28 or a chart recorder 30.

Having provided a basic description of a dynamic pupillometer for measuring the size of a pupil of an eye containing means for generating scanning signals of the eye, such as the television camera system 10, and means for generating a count pulse each time the scanning signals indicate that the pupil has been scanned, such as the combined circuits of the inhibit gate 12, the wave shaper 16, and the amplitude comparator 18; a detailed description of a preferred embodiment of a display of measurement adequacy marker system will now be presented.

The display of measurement adequacy marker system comprises two basic elements; namely, means for producing a picture of the eye from the scanning signals, such as television monitor 32, and means for transmitting the count pulse to the picture producing means for conversion into a visible marker which identifies the portion of the eye which is being measured, such as the delay network 34 which transmits count pulses from the output of the amplifier 20 to the grid-cathode circuit of the television monitor cathode ray tube (CRT).

During the initial adjustment of the pupillometer, the monitor 32 is used to insure that the television camera system 10 is properly aligned and focused so that a picture of the eye, similar to that shown in the block labelled "Television Monitor 32" is obtained. As shown, the image of the eye on the monitor 32 comprises three parts; namely, that of the sclera 36, the iris 38 and the pupil 40. Arrow 42 indicates the direction of measurement which is orthogonal to the direction of the scanning lines 44. The arrow aids in alignment of the pupillometer when an animal which has a noncircular pupil, such as the cat, is used as a subject.

In addition to the video signal, output count pulses of the amplitude comparator 52 are also transmitted to the monitor 32 so that they can be combined with the video signal. The count pulses are converted into visual form and displayed on the monitor 32 CRT within the pupil image as a crescent-shaped, bright line known as a display of measurement adequacy marker 46. When the pupillometer is adjusted properly, the radius of curvature of the crescent-shaped marker is identical to that of the leading boundary 48 of the pupil 40.

The marker 46 is formed by applying the count pulses to the grid-cathode circuit of the monitor 32 CRT to cause the image to brighten each time a count pulse is generated.

Clearly, if the pupillometer is not functioning properly, the white marker 46 will not appear behind the leading edge of the pupil. If, for example, the amplitude comparator 18 is improperly adjusted so that the diameter of the iris rather than the pupil is being measured, the marker 46 will appear behind the leading edge of the iris and have a radius of curvature equal to that of the leading edge of the iris. Similarly, if spurious signals are generated by noise in the electronics system or objects such as eyelashes, markers will appear on the monitor CRT instantly to warn the operator of a malfunction and to give precise information on what portion of the image is introducing error. Conversely, the failure to obtain a marker 46 also serves as an indication of malfunction as does an erratic marker.

Although it is possible to make the marker 46 appear superimposed on top of the leading edge 48 of the pupil by connecting the output of the amplifier 20 directly to monitor marker pulse input terminal 50, the marker 46 preferably is shifted to a position behind the leading edge of the area being measured so that both the marker and the edge will be clearly and independently visible. The shift is accomplished by transmitting the count pulses from the amplifier 20 to the monitor 32 through a delay network 34 so that the count pulse transmission time to the monitor is increased.

Preferably, the delay network 34 should provide a variable delay which can be adjusted by the operator so that the marker can be moved from a position coincident with the leading edge of the boundary (or trailing edge in some embodiments) being measured for positive identification of the area, to some other location which facilitates easy viewing.

A simple, but very efficient, delay network can be obtained by combining an amplitude comparator 52, such as the comparator module 18, with a low-pass filter 54, such as an R-C network having one or more variable impedance elements.

Count pulses from the amplifier 20 are then transmitted to the low-pass filter 54 where they are delayed by the requisite time in response to the setting of the filter's variable impedance elements, here a rheostat 56 which in combination with the capacitor 58 forms the low-pass filter 54.

The delayed pulses from the low-pass filter 54 may be transmitted directly to the monitor pulse input terminal 50; however, marker clarity can be improved by passing the pulses to the amplitude comparator 52 which generates new, sharper pulses of a desired width, which may be different from that of the count pulses which have been transmitted to the delay network 34.

The amplitude comparator 52 contains two transistors 60 and 62. Transistor 60 normally is biased off while transistor 62 normally is biased on. The transistors 60 and 62 will switch states momentarily and generate an output pulse if a positive pulse of sufficient magnitude is applied to the base of transistor 60. The minimum pulse amplitude required for the comparator to switch states is a function of the D.C. bias level on the base of transistor 60 and this in turn is controlled by the setting of potentiometer 64. Thus by regulating the settings of either or both of the variable resistances 56 and 64, the pulse delay time can be readily controlled.

A preferred embodiment of a display of measurement adequacy marker system of this invention, as incorporated in an electronic pupillometer, which has general application in both research and clinical environments has been described. It will be appreciated by those skilled in the art that a number of modifications are possible for the purpose of optimizing the performance of a particular pupillometer for some experiment. In addition to substituting different delay network components for the amplitude comparator 52 or the low-pass filter 54, modifications of the marker system and the pupillometer are easily accomplished where special displays are required.

For example, where a pupillometer is used in an experiment in which the pupil-iris boundary is relatively well defined and where it is desired to have a display of measurement adequacy marker for the entire pupil-iris boundary, as would be the case where information on the position of the eye as well as the size of the pupil is required, the wave shaper 16 may comprise a differentiator so that only pulses representing the derivative of the video signal are transmitted to the amplitude comparator which in turn generates one or more count pulses which identify both the leading and the trailing boundaries of the pupil. A Schmitt trigger can also be used as the amplitude comparator when a trailing edge marker is required.

Further, the use of display of measurement adequacy marker systems is not limited to television pupillometers, but is equally well suited for incorporation into electromechanical scanning pupillometers such as those developed by Lowenstein and Loewenfeld. Where an electromechanical scanning pupillometer is used, the photosensitive unit which receives the light reflected from the eye and transduces it into electrical scanning signals is substituted for the television camera system 10 and the electromechanical pupillometer circuitry prior to the integrating amplifier or peak detector may be substituted for modules 12, 16, 18 and 20. The "end of field" identification signal is then sent to the computer 22 over the line marked "Vertical Sync" and the "Horizontal Sync" line may be eliminated.

As a feature of the systems of this invention is great flexibility in use and instrumentation, it is easily appreciated that a number of modifications, such as those suggested above, can be made to the instrument which has been described to obtain embodiments which, while structurally different from the illustrated embodiment, are so long as they are within the scope of the invention as defined by the following claims.

What is desired to be claimed by Letters Patent of the United States is:

1. In a dynamic pupillometer for measuring the size of a pupil of an eye containing means for generating scanning signals of the eye, and means for generating a count pulse each time the scanning signals indicate that the pupil has been scanned; a display of measurement adequacy marker system comprising:

(a) monitoring means for producing a picture of the eye from the scanning signals; and (b) means for transmitting the count pulse to the monitoring means, said means for transmitting including means responsive to each count pulse for providing a marker pulse and means for applying each marker pulse to said monitoring means to provide a visible marker superimposed upon the picture of the eye which identifies the portion of the eye which is being measured.

2. The combination of claim 1 wherein the pulse transmitting means comprise:

means for delaying the transmission of the pulse to the picture producing means.

3. The combination of claim 2 wherein the delaying means comprise:

a low-pass filter.

4. The combination of claim 3 wherein the low-pass filter comprises:

an element having an adjustable impedance.

5. The combination of claim 2 wherein the delaying means comprise:

an amplitude comparator.

6. The combination of claim 1 wherein the pulse transmitting means comprise:

(a) a low-pass filter containing an element having an adjustable impedance; and (b) an amplitude comparator having its input connected to the output of the low-pass filter and its output connected to the means for converting the pulse into a visible marker.

7. The combination of claim 1 wherein said means for applying to provide the visible marker which identifies the portion of the eye which is being measured comprises means for superimposing said visible marker over the picture of the eye produced from the scanning signals.

References Cited

UNITED STATES PATENTS

| | | | |
|---|---|---|---|
| 3,390,229 | 6/1968 | Williams | 178—6 |
| 2,445,787 | 7/1948 | Lilienfeld | 351—7 |
| 2,573,464 | 10/1951 | Lowenstein et al. | 351—7 |
| 3,244,810 | 4/1966 | Williams | 178—6 |
| 3,261,967 | 7/1966 | Rosin et al. | 178—6 |
| 3,321,575 | 5/1967 | Lewczyk | 178—6 |

DAVID SCHONBERG Primary Examiner

P. A. SACHER, Assistant Examiner

U.S. Cl. X.R.

178—6; 351—6